US 9,902,089 B2
Feb. 27, 2018

(12) United States Patent
Halford

(10) Patent No.: US 9,902,089 B2
(45) Date of Patent: Feb. 27, 2018

(54) TOOL TEMPERATURE CONTROL

(75) Inventor: Ben Halford, Rutland (GB)

(73) Assignee: SURFACE GENERATION LIMITED, Rutland (GB)

( * ) Notice: Subject to any disclaimer, the term of this patent is extended or adjusted under 35 U.S.C. 154(b) by 925 days.

(21) Appl. No.: 14/236,288

(22) PCT Filed: Aug. 7, 2012

(86) PCT No.: PCT/GB2012/051916
§ 371 (c)(1),
(2), (4) Date: Jul. 25, 2014

(87) PCT Pub. No.: WO2013/021195
PCT Pub. Date: Feb. 14, 2013

(65) Prior Publication Data
US 2014/0367889 A1 Dec. 18, 2014

(30) Foreign Application Priority Data

Aug. 8, 2011 (GB) .................................. 1113655.3

(51) Int. Cl.
B29C 33/04 (2006.01)
B29C 35/02 (2006.01)
B29C 35/04 (2006.01)
B29C 33/38 (2006.01)
B29C 33/02 (2006.01)
(Continued)

(52) U.S. Cl.
CPC .......... B29C 33/04 (2013.01); B29C 35/0288 (2013.01); B29C 35/0294 (2013.01); B29C 35/045 (2013.01); B22D 27/04 (2013.01); B29C 33/30 (2013.01); B29C 45/2642 (2013.01); B29C 45/2737 (2013.01); B29C 45/73 (2013.01); B29C 45/7312 (2013.01); B29C 2033/023 (2013.01); B29C 2033/042 (2013.01); B29C 2033/385 (2013.01); B29C 2035/1658 (2013.01); B29K 2995/0015 (2013.01); F28D 15/00 (2013.01)

(58) Field of Classification Search
None
See application file for complete search history.

(56) References Cited

U.S. PATENT DOCUMENTS 2,689,372 A   9/1954 Goulding, Jr. et al.
3,043,017 A * 7/1962 Strickland ............ B29C 33/046
                                                      34/104
(Continued)

FOREIGN PATENT DOCUMENTS

CN   1144735 A     3/1997
DE   4000355   *  5/1991
(Continued)

OTHER PUBLICATIONS

JPO Office Action dated Jan. 5, 2016 in JP Application No. 2014-524443.
(Continued)

Primary Examiner — Jacob T Minskey
Assistant Examiner — Manley L Cummins, IV
(74) Attorney, Agent, or Firm — Young Law Firm, P.C.

(57) ABSTRACT

A tool (100) comprises a plurality of layers (102, 104, 106) which are arranged to provide a thermally agile tool face (110) and to protect control circuitry and delicate components (150) from excessive temperatures.

18 Claims, 6 Drawing Sheets

(51) Int. Cl.
    *B29C 35/16*    (2006.01)
    *B22D 27/04*    (2006.01)
    *B29C 45/73*    (2006.01)
    *B29C 45/26*    (2006.01)
    *B29C 45/27*    (2006.01)
    *F28D 15/00*    (2006.01)
    *B29C 33/30*    (2006.01)

(56) References Cited

U.S. PATENT DOCUMENTS

| | | | | |
|---|---|---|---|---|
| 3,081,488 A * | 3/1963 | Casavina | B29C 44/445 | 249/79 |
| 4,053,126 A * | 10/1977 | Duret | B29C 33/04 | 244/117 R |
| 4,431,397 A * | 2/1984 | Fried | B29C 33/34 | 249/137 |
| 4,621,995 A * | 11/1986 | Wersosky | B29C 33/046 | 137/625.33 |
| 4,623,503 A * | 11/1986 | Anestis | B29C 33/046 | 264/302 |
| 4,867,660 A | 9/1989 | Nagase | | |
| 5,106,285 A * | 4/1992 | Preston | B29C 33/04 | 137/605 |
| 5,221,539 A * | 6/1993 | Pallerberg | B29C 33/04 | 264/302 |
| 5,332,381 A | 7/1994 | Shapcott | | |
| 5,443,777 A * | 8/1995 | Mills | B29C 33/046 | 264/255 |
| 5,993,721 A | 11/1999 | Kurihara et al. | | |
| 6,344,163 B1 | 2/2002 | Ashley | | |
| 2002/0162940 A1 * | 11/2002 | Frul | H02K 1/278 | 248/683 |
| 2005/0035115 A1 * | 2/2005 | Anderson | B29C 33/04 | 219/759 |
| 2005/0115955 A1 * | 6/2005 | Huang | B29C 43/52 | 219/548 |
| 2005/0184416 A1 * | 8/2005 | McCollum | B29C 45/37 | 264/40.5 |
| 2009/0011063 A1 * | 1/2009 | Davie | B29C 33/02 | 425/144 |
| 2009/0071217 A1 * | 3/2009 | Matsen | B21D 37/16 | 72/342.3 |
| 2010/0221373 A1 * | 9/2010 | Chen | B29C 33/04 | 425/3 |
| 2013/0113141 A1 * | 5/2013 | Sorensen | B29C 33/02 | 264/404 |

FOREIGN PATENT DOCUMENTS

| | | |
|---|---|---|
| DE | 4000355 A1 | 5/1991 |
| JP | 2000-084980 | 3/2000 |
| JP | 2002333372 A | 11/2002 |

OTHER PUBLICATIONS

International Search Report dated Feb. 14, 2013 in related PCT application PCT/GB2012/051916.
Written Opinion on the International Searching Authority dated Mar. 20, 2013 in related PCT application PCT/GB2012/051916.
GB Search Report Under Section 17 dated Dec. 8, 2011 in related GB1113655.3.

* cited by examiner

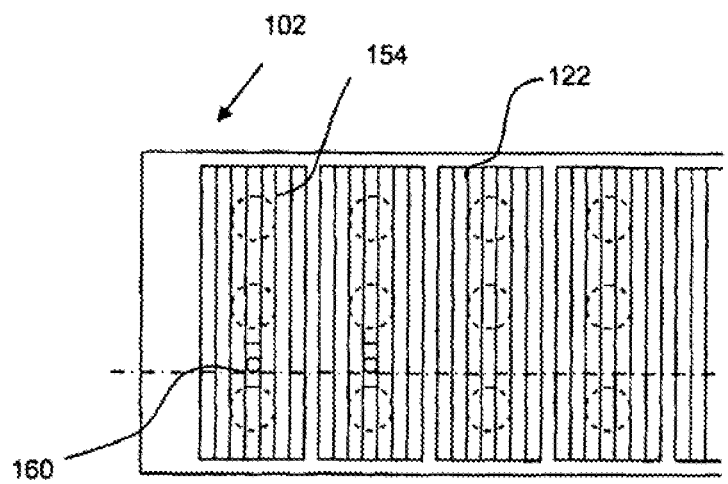
Fig. 3a
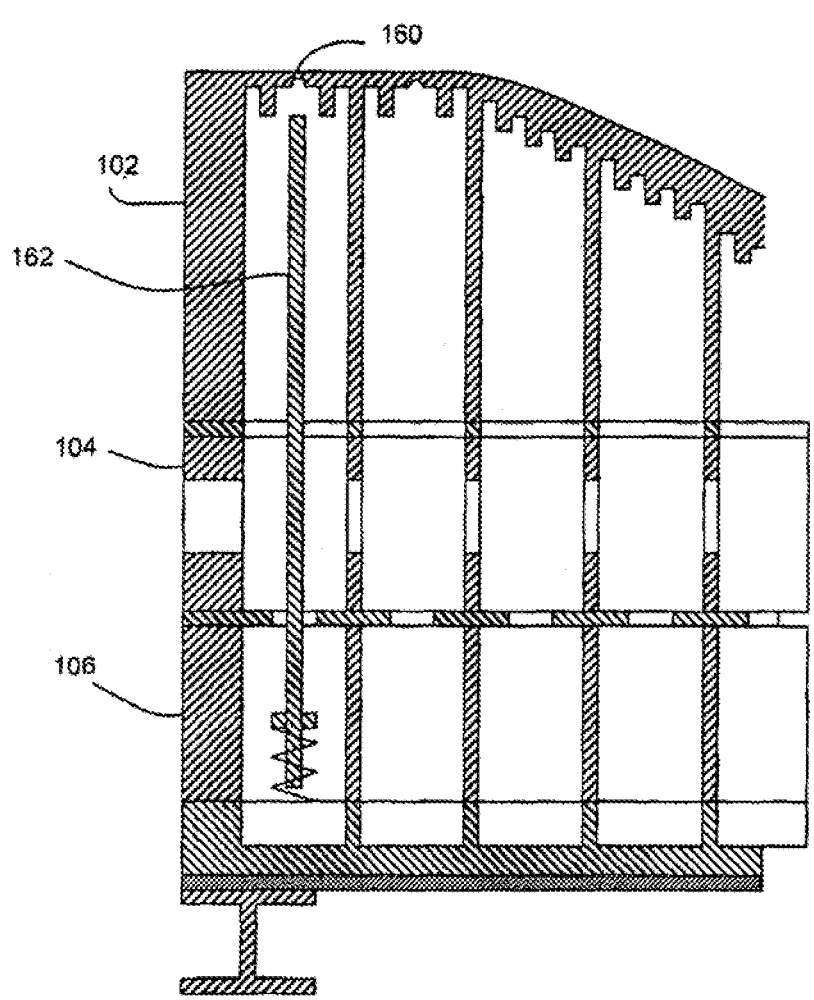
Fig. 3b
Fig. 3

TOOL TEMPERATURE CONTROL

The present invention is concerned with a tool. More specifically, the present invention is concerned with a tool having a temperature controlled tool face for the moulding of metal plastics and composite materials.

It is known to vary the temperature of a workpiece during the forming process in order to achieve the required result. This may include placing the entire tool assembly in an autoclave in order to cure the subject material to achieve the desired material properties in the workpiece.

One problem with this approach is that autoclaves are large, inefficient and therefore expensive to install and use. Another problem is that the workpiece will be usually cured at a single temperature; dynamic temperature control across the workpiece is generally not possible. It is desirable to vary the temperature across the workpiece in instances where the thickness or required material properties need to be varied depending on the eventual functional specification of that workpiece.

Approaches to dynamic and variable workpiece temperature control have been proposed. Once such approach is disclosed in the applicant's earlier application published under number WO 2011/048365. This application proposes the use of a heating and/or cooling fluid pumped through a series of adjacent tool pins in order to vary the temperature of a tool face across a tool face.

Such tool pins are constructed from materials with high thermal conductivity such as metals. The harsh environment and thermal conductivity of the metal material means that the heating/cooling control electronics and temperature measurement circuitry cannot easily be installed therein. Instead, known techniques utilise remote heating cooling units which pump heated or cooled fluid into the tool.

This approach is complicated, and inefficient because the heated or cooled fluid must travel along the supply lines.

A further problem with the prior art is that in order to machine fluid channels in the pins, they must be quite bulky. This is disadvantageous because they will have a high thermal inertia. In other words they will take time and energy to heat up and cool down. This is disadvantageous if the workpiece temperature is to be carefully controlled. Such tools are also inefficient.

It is an object of the present invention to overcome or at least mitigate the aforementioned problems.

According to a first aspect of the present invention there is provided a tool for forming a workpiece comprising:
 a first layer defining a tool face, and a temperature control surface opposite the tool face,
 a second layer defining a second layer fluid chamber in fluid communication with the temperature control surface and an exhaust port to exhaust fluid from the tool,
 a third layer on the opposite side of the second layer to the first layer, a fluid injector comprising an inlet and an outlet, which injector extends from the third layer, through the second layer to the first layer such that the outlet is proximate the temperature control face.

Advantageously, a layered approach allows the most extreme temperatures to be isolated to the first layer with the second layer providing a mid-temperature exhaust region. The third layer is isolated from the second layer where the temperature inlet, thermocouple and control systems can be located.

In addition, it will be noted that the thermal mass being controlled is limited to the first layer. Because the second layer is used to exhaust the temperature control fluid, this can be thermally isolated from the first layer thus providing an increased thermal agility in the first layer and therefore the tool face of the tool. As such, the tool temperature can be more easily and quickly adjusted.

Further, by providing a third layer which can be thermally insulated from the exhaust layer, all of the necessary electronics for the control of the tool face temperature can be safely stored here. Because the third layer is isolated from the first and second layers, the temperature can be moderated.

Preferably a first insulating layer is positioned between the first layer and the second layer, the first insulating layer being constructed from material with a lower thermal conductivity than the first layer.

Preferably a second insulating layer is positioned between the second layer and the third layer, the second insulating layer being constructed from material with a lower thermal conductivity than the second layer.

Preferably the first layer defines a first layer fluid chamber bounded by the temperature control surface, the first layer fluid chamber and the second layer fluid chamber being in fluid communication.

According to a second aspect of the invention there is provided a method of manufacturing a workpiece comprising the steps of:
 providing a tool according to the first aspect,
 providing an opposing tool,
 forming a workpiece between the tool and the opposing tool.

According to a third aspect of the invention there is provided a thermal control assembly for a mould tool comprising:
 a base portion for attachment to a mould tool,
 a thermal effector or transducer movably attached to the base portion and resiliently biased such that the effector or transducer self aligns upon assembly of the base portion to a mould tool.

By "effector" we mean a means for heating or cooling a mould tool such as a heater or ambient air blower. By "transducer" we mean a means for measurement of temperature such as a thermocouple.

Preferably the thermal effector is a heater, more preferably the heater is an in-line fluid heater having an outlet oriented towards a mould tool in use.

Preferably there is provided an abutment member mounted for movement with the thermal effector or transducer, which abutment member is configured to project to a position further from the base than the effector or transducer to contact a mould tool and thereby position the transducer or elector in a predetermined position spaced from a mould tool in use.

Preferably the thermal effector is movably attached to the base portion, and a thermal transducer is movably attached to the thermal effector and resiliently biased such that the effector and transducer self align upon assembly of the base portion to a mould tool.

Preferably the effector and transducer are mounted by respective resilient elements, in which the transducer resilient element is less stiff than the effector resilient element.

According to a fourth aspect of the invention there is provided a mould tool comprising a thermal control assembly according to the third aspect.

Preferably the tool comprises, a support part, and a second part attached to the support part in which the second part defines a tool face, wherein the base is attached to the second part such that the thermal effector and/or transducer is biased towards the tool face, and in which the first part of the mould tool is replaceable. This may be achieved by mechanical fasteners such as bolts or screws.

An example tool in accordance with the present invention will now be described with reference to the following figures in which:

FIG. 3b is an alternative section through the tool of FIG. 1;

Figure 1:
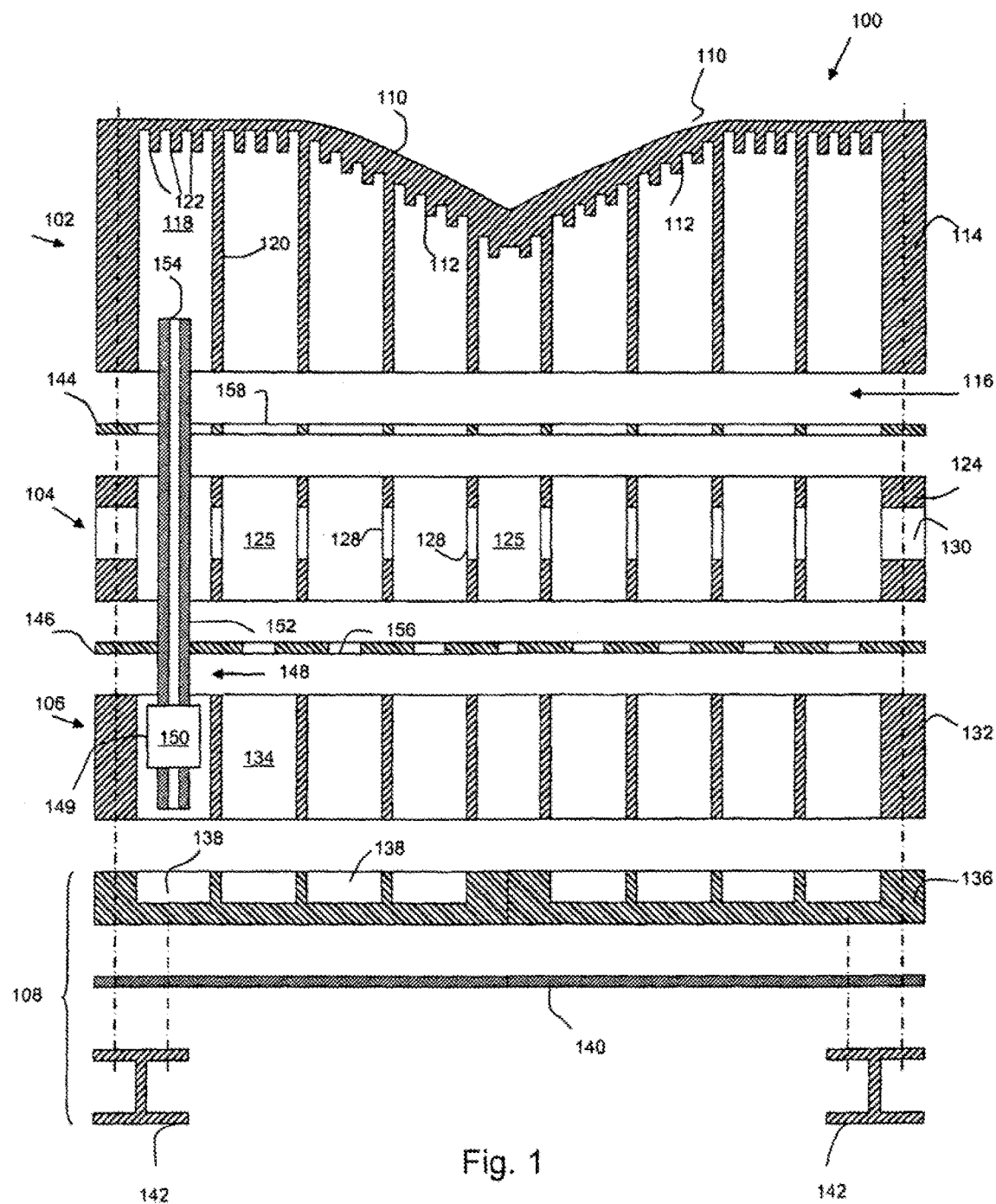
FIG. 1 is an exploded side section view of a first tool in accordance with the present invention.
Figure 2:
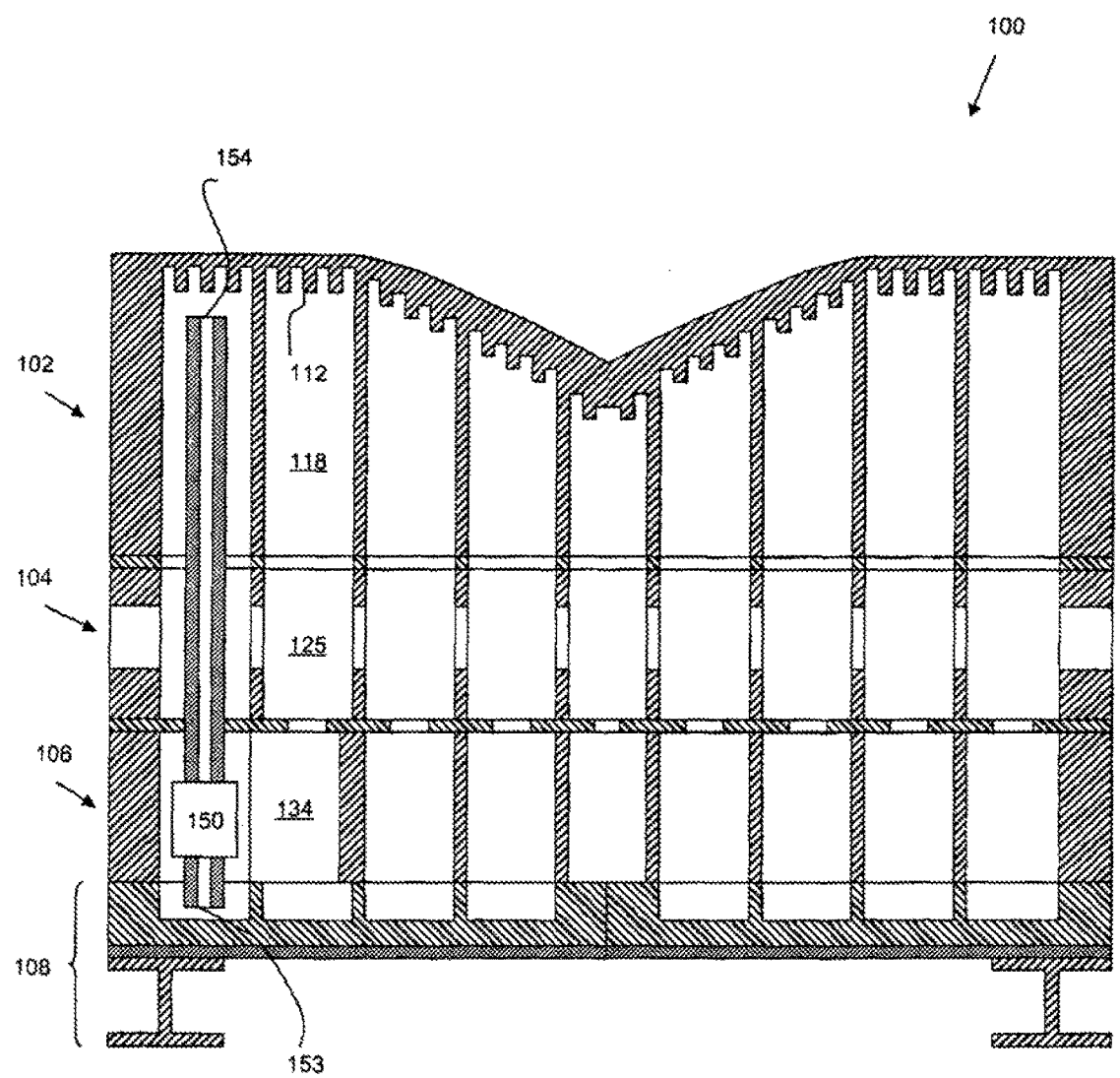
FIG. 2 is an assembled view of the tool of FIG. 1.

Referring to FIGS. 1 and 2, a tool 100 comprises a first layer 102, an intermediate layer 104, a second layer 106 and a support assembly 108.

The first layer 102 comprises a tool face 110. The tool face 110 reflects the shape of a workpiece to be formed, and in use is associated with an opposing tool (not shown). On the underside of the tool face 110, a temperature control surface 112 is defined as will be described below.

The first layer 102 is surrounded by a peripheral wall 114 so as to define an enclosed volume. The first layer 102 defines a number of discrete chambers 118 which are bound by a part of the temperature control surface 112 at a first and open at a second end 116. The chambers 118 are separated by chamber walls 120 which extend from the temperature control surface 112 to the open ends 116. As such, the first layer 102 defines a type of honeycomb structure comprising a number of discrete cell-like chambers 118.

The temperature control surface 112 comprises a number of ribs 122. The ribs 122 provide a large surface area of the temperature control surface 112 for the fluid within the chamber 118 to contact and thereby encourage heat transfer between the fluid and the temperature control surface 112. As such, any fluid instant in the chamber 118 will influence the temperature of the tool face 110 by conduction through the first layer 102.

will influence the temperature of the tool face 110 by conduction through the first layer 102.

The second layer 106 comprises a block 132 having a series of through bores 134. Each of the through bores 134 contains mounting apparatus for au inline air heater (as will be described below).

The support assembly 108 comprises a sealing plate 136 having a plurality of blind bores 138 defined therein, a support plate 140 and a plurality of I-beams 142.

In addition to the above mentioned components a first gasket 144 and a second gasket 146 are provided.

The intermediate layer 104 is intermediate the first and second layers and comprises a block 124 having a number of through bores 125 defined therein. The through bores 125 are in fluid communication via internal ports 128. The through bores proximate the periphery of the block 124 are in fluid communication with the exterior of the tool via exhaust ports 130. As such, the intermediate layer 104 provides an exhaust functionality as will be described below.

The tool 100 is assembled as follows.

The I-beams 142 form a reaction structure for the tool such that any compressive loads imparted by the opposing tool (not shown) upon the tool face 110 can be reacted. The support plate 140 is mounted on the I-beams 142 and the sealing plate 136 is positioned on top of the support plate 140 as shown in FIG. 2. The second layer 106 is then mounted to the support plate 140 such that each of the through bores 134 aligns with a respective blind bore 138 of the seal plate 136.

An inline air heater 148 is provided having a heater assembly 150, an elongate tube section 152 and an outlet 154. The heater assembly 150 is mounted within the second layer 106 within a through bore 134. It will be noted that a plurality of such heaters are installed into each of the through bores 134. Upwardly projecting thermocouples will also be installed and will be described in more detail below.

The second gasket 146 is placed on top of the second layer 106. The second gasket 146 comprises a plurality of orifices 156 which form a tight seal around the tube section 152 of the heater 148. As such, when each of the heaters 148 is installed along with the gasket 146, each of the bores 134 is sealed by virtue of the seal plate 136 beneath and the gasket 146 above.

The intermediate layer 104 is then placed on top of the second layer 106 such that each of the through bores 125 is aligned with a respective through bore 134. As such, each of the through bores 125 has part of an air heater tube section 152 contained therein.

The first gasket 144 is placed on top of the intermediate layer 104. The first gasket 144 comprises a series of orifices 158 which are substantially wider than the sections 152 of the heaters 148 such that the through bores 125 are upwardly open.

Finally, the first layer 102 is stacked onto the intermediate layer 104 such that each of the chambers 118 is aligned with a respective through bore 125. As such, the through bores 125 and the chambers 118 are each in fluid communication with each other.

As will be seen in FIG. 2, when assembled the outlet 154 of the tube section 152 ejects proximate the temperature control surface 112 of the first layer 102.

Each of the gaskets 144, 146 is constructed from a thermally insulating material. The material has a thermal conductivity lower than the material used to construct the layers 102, 104. As such, conduction between the first layer 102 and the intermediate layer 104 is minimised.

Similarly, conduction between the intermediate layer 104 and the second layer 106 is minimised due to the second gasket 146. In addition, because the orifices 156 form a tight seal around the tube sections 152 of the heaters 148, no passage of fluid between the through bore 125 and through bores 134 is permitted. As such, heat transfer by way of conduction and convection is not permitted between the intermediate layer 104 and the second layer 106.

Turning to FIG. 3a, an underside view of the first layer 102 is visible. A series of small recesses or dimples 160 are formed in the temperature control surface 112. In addition to the inline air heaters 148 extending from the second layer 106 through the intermediate layer 104 to the first layer 102, a series of thermocouples 162 having elongate bodies are spring-loaded upwardly from the second layer 106 towards the temperature control surface 112 and into the recesses 160. As such, if the first layer 102 is changed (for example to define a tool face 110 having a different profile), then the thermocouples can move as appropriate and remain in contact with the temperature control surface 112. This allows them to accurately measure the temperature of the first layer 102.

It will be noted that each of the thermocouples 162 is connected to a control system which in turn controls each of the heaters 150 such that the desired temperature of the tool face 110 can be achieved. Such a system is known in the art and will not be described here.

In use, air is pumped into an inlet 153 of the inline air heater 148 and is heated by the heater assembly 150. Control circuitry and wiring 149 to the heater 150 is passed through the walls of the second layer 106.

The heated air travels up the elongate tube section 152 to the outlet 154 where it impinges on the temperature control surface 112. Heat is thereby transferred to the temperature control surface 110 and conducted to the tool face 110. Air then circulates downwardly through the chamber 118 into the intermediate layer 104 where it passes through adjacent interior ports 128 and is finally exhausted at the exhaust ports 130.

It will be noted that convection of fluid into the second layer 106 is not permitted due to the presence of the gasket 146.

Because the fluid exiting from the outlet 154 will have cooled by the time it impinges and rebounds to the intermediate layer 104, it will have cooled slightly. Because the intermediate layer 104 is conductively isolated from the first layer 102, it will be slightly cooler. Because no conduction or convection is permitted between the intermediate layer 104 and the second layer 106, the second layer 106 will be significantly cooler than the intermediate layer 104 and, as such, any potential damage to the heater assembly 150, the control circuitry therein or the thermocouple control circuitry 162, can be avoided. As such, all the necessary electronics and services can be installed within the second layer 106 without significant problems arising from an elevated (or lowered in the case of cooling) temperature.

Furthermore, because the intermediate layer 104 is conductively isolated from the first layer 102, the thermal mass of the first layer 102 is reduced, therefore making it easier to dynamically change the temperature of the tool face 110 using heated fluid.

The result is a highly thermally agile tool in Which the temperature across the various zones (controlled by the different chamber 118) can be independently and easily varied.

Figure 4:
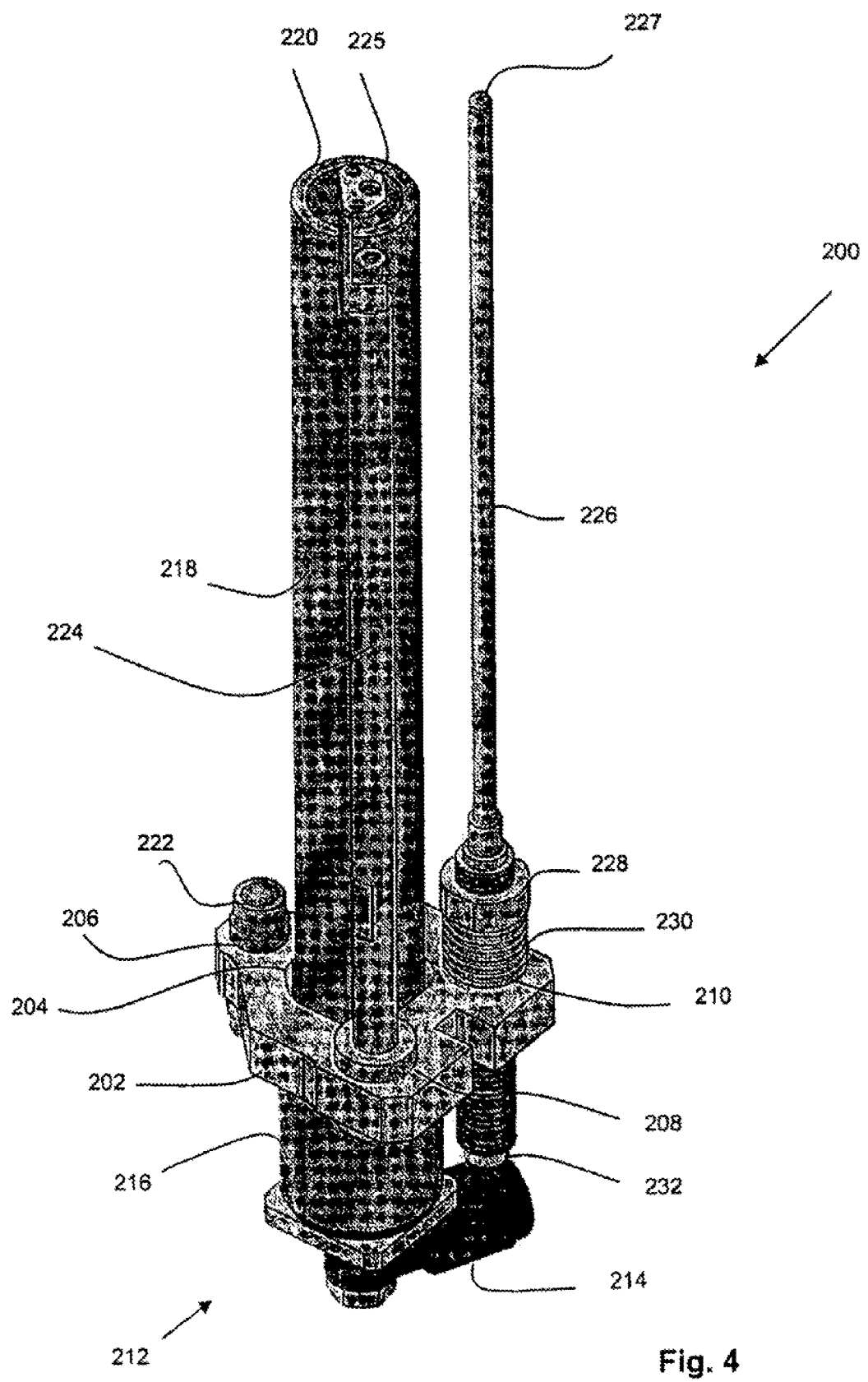
FIG. 4 is a perspective view of a part of a second tool in accordance with the present invention.

Turning to FIG. 4, the detailed design of an inline heater assembly 200 is shown. Such a heater assembly 200 may be used with the tool 100.

The assembly 200 comprises a support frame 202 defining a heater receiving bore 204 in its centre, with an attachment bore 206, an abutment receiving bore 208 and a thermocouple receiving bore 210 spaced about the periphery of the heater receiving bore. The peripheral bores 206, 208 and 210 are approximately equally spaced around the heater receiving bore 204.

An inline air heater 212 is provided in the assembly 200. The heater 212 comprises an air inlet 214 which feeds to a chamber 216. The chamber 216 is in fluid communication with a heater tube 218, which contains an electric heating element.

The chamber 216 contains the necessary control and power electronics for the heater. The tube 218 terminates in an axial outlet 220.

The heater 212 sits within the heater receiving bore 204 of the frame 202 and is attached thereto by conventional attachment means (e.g. fasteners such as screws, or welding).

Returning to the frame 202, an attachment lug 222 is installed in the attachment bore 206. The lug 222 is suitable for attachment within a tool such as the tool 100. In particular, the attachment lug is connected to the tool so as to be relatively movable thereto (e.g. sliding on a vertical shaft). The attachment lug, and hence the assembly 200 can therefore move relative to the tool, and preferably the assembly 200 is mounted to be resiliently biased towards the tool control surface (i.e. the underside of the tool face) for reasons that will be described below.

An abutment rod 224 is provided mounted into the abutment receiving bore 208, being fixed to the frame 202. The abutment rod 224 extends parallel to, and past the end of the heater tube 218. The abutment rod 224 defines a tip 22 which sits a predetermined axial distance from the end of the tube 218. When the part of the tool comprising the tool face is placed onto the tool, the face opposite the tool face (the temperature control surface) will contact the tip 225 of the abutment rod 224 and push the assembly 200 downwards. Because of the fixed distance between the tip 225 and the tube 218, the end of the tube 218 will remain at the predetermined distance from the tool temperature control surface. This distance will be optimised to provide the desired heating/cooling characteristics.

The axial position of the abutment rod 224 in the abutment receiving bore 208 can be adjusted so as to adjust the predetermined distance between the end of the tube 218 and the temperature control surface of the tool in use.

An elongate thermocouple 226 is located within the thermocouple receiving bore 210 and comprises a tip 227. The thermocouple 226 comprises a flange 228 and a compression spring 230 which is trapped between the flange 228 and the frame 202 such that the thermocouple 226 is axially resiliently biased. Per the thermocouple 162 the tip 227 locates within a formation in a temperature control surface of a tool to measure the temperature thereof. Necessarily, the spring 230 is less stiff than the spring which urges the frame 202 upwards.

Figure 5:
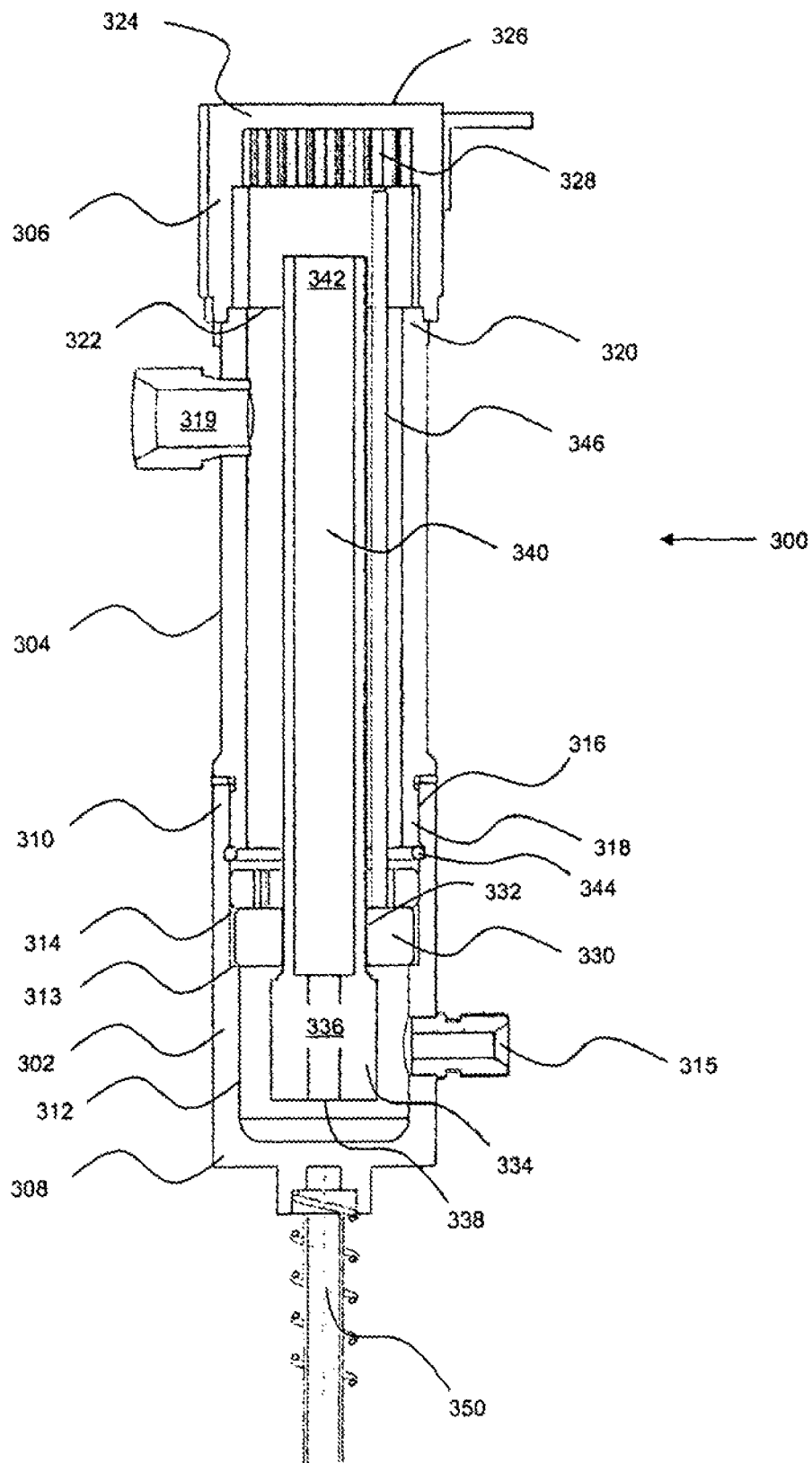
FIGS. 5 and 6 are views of a third tool in accordance with the present invention.
Figure 6:
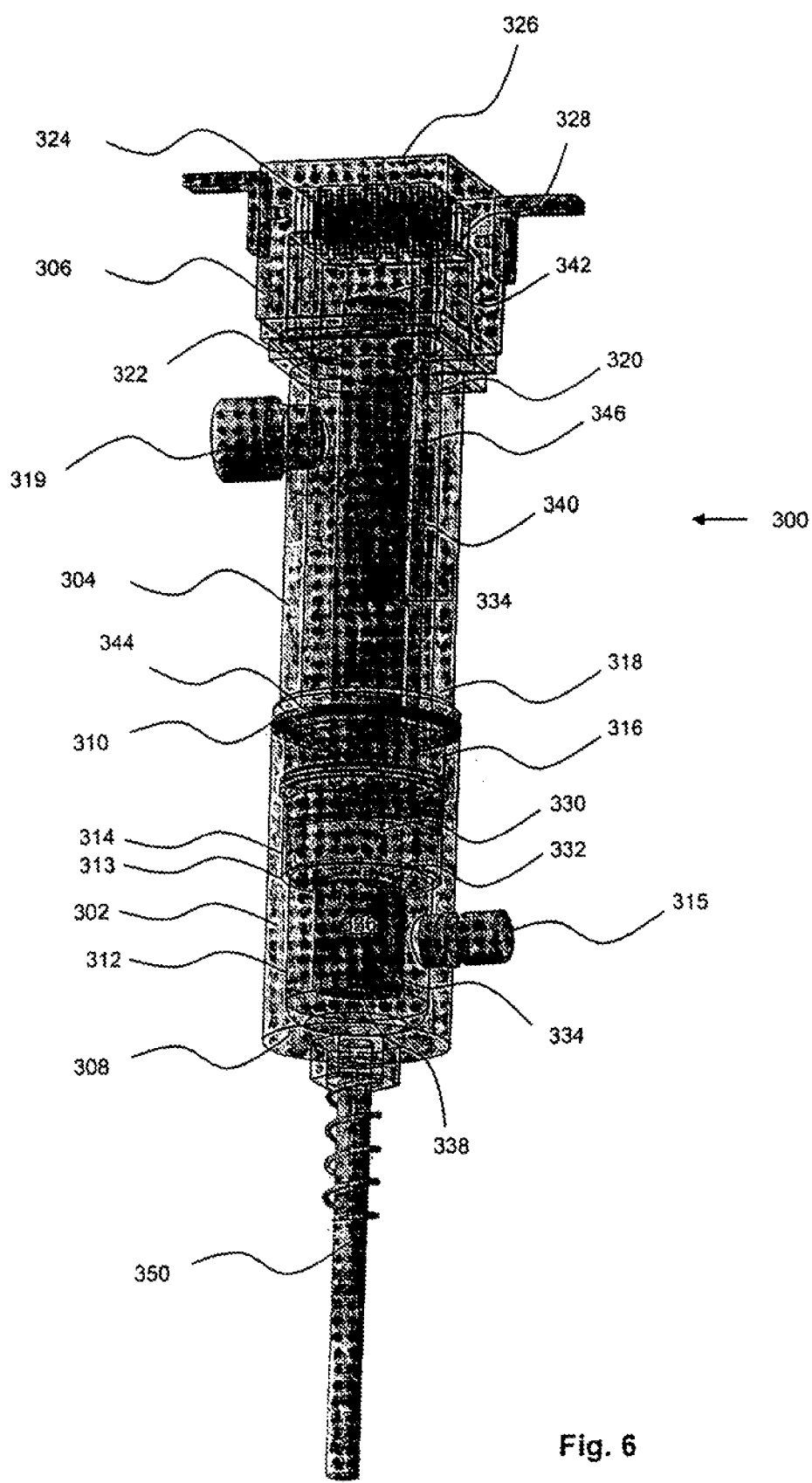

Turning to FIG. 5, an alternative tool comprises a series of tessellating tool elements 300. Each tool element 300 comprises a first body 306, an intermediate body 304 and a second body 302.

The first body 306 is generally cube shaped and has a circular opening 322 defined on one side. Opposite the opening 322 a wall 324 has a tool face 326 defined on the exterior surface thereof. Opposite the tool face 326 a temperature control surface 328 is defined, whose surface area is increased with a plurality of adjacent machined bores formed therein.

The intermediate body 304 is generally cylindrical. The intermediate body 304 is open at a lower end 318 and an upper end 320. The intermediate body 304 defines an exhaust port 319 defined in a sidewall and in fluid communication with its interior.

The second body 302 is cylindrical and is of generally the same outer diameter as the intermediate body 304. The second body 302 is hollow having a closed end 308 and an open end 310. The second body 302 defines a first bore portion 312 leading to the closed end 308 and opening out at a shoulder 313 to a second, larger diameter bore portion 314. The second bore portion 314 opens again to a third bore portion 316 which terminates at the open end 310. A fluid/service inlet 315 is provided in a sidewall of the second body 302 and is in fluid communication with the first bore portion 312.

A divider 330 is provided within the second body 302 and is an annular member having a central bore 332 defined therethrough.

An inline air heater 334 is provided within the tool element 300. The heater 334 comprises a control/service section 336 which has an air inlet 338. The control/service section 336 contains the necessary electronics to control and power the heater 334. The inlet 338 is in fluid communication with an air tube 340 which extends to an axial outlet 342. An air heater (not shown) is disposed within the tube 340.

In order to assemble the element 300, the inline air heater 334 is placed into the second body 302 and supported by the divider 330. It will be noted that the divider 330 when assembled with the heater 334 does not completely seal the second body 302 but allows passage of fluid past the tube 340 from the open end 310.

The intermediate body 304 is attached at its lower end 318 to the second body 302 and sealed with an o-ring 344 to prevent leakage of fluid within the element 300.

The first body 306 is attached to the intermediate body 304 at the upper end 320 thereof and sealed in place.

It will be noted that the outlet 342 is directed to the temperature control surface, and as such is arranged to heat (or cool if desired) the tool face 326.

A first thermocouple 346 extends from the first body 306 the temperature control surface 328.

A second thermocouple 350 extends into the second body 302 to measure the fluid temperature therein.

In use, the element 300 is connected to an air supply at the inlet 315, and to an exhaust hose at exhaust port 319. All electrical control and power wires are routed through the air supply 315 and enter the interior of the second body 302 at the fluid/service inlet 315. Therefore the invention utilises a single bore for both utilities and air supply.

Some of the air from the inlet passes through the heater 334 and is heated to impinge on the temperature control surface 328 where it heats the tool face 326. Cooling can also be achieved by simply deactivating the heating element an continuing ambient air flow. Once the air has impinged on the temperature control surface 328 it flows back into the intermediate body 304 where it can exit via the exhaust port 319.

The element 300 is designed such that the pressure in the second body 302, surrounding the electronics in the heater and thermocouple is higher than that in the cavity defined by the intermediate and first bodies 304, 306. This is beneficial to keep a constant flow of cool air flowing past the utilities, past the divider 330 and into the intermediate and first bodies 304, 306 to mix with the heated air and exhaust at the port 319. In this way, the utilities layer (represented by second body 302) is kept at a controlled temperature.

It will also be noted that the join between the second and intermediate bodies 302, 304 minimises contact and therefore conduction therebetween. The positioning of the outlet port 319 near the first body 306 also assists in making sure that the lower utilities level is not excessively heated.

The temperature in the second body 302 can be carefully monitored by the second thermocouple 350.

In use, several elements 300 will be welded together to provide a continuous and variable temperature tool face.

It will be noted that the tool pin 300 is a single unit version of the tool 100, with the first, intermediate and second bodies 306, 304, 302 having the same function as the first, intermediate and second layers 102, 104, 106, i.e. tool temperature control, exhaust and utilities protection respectively.

The tools described above are particularly suited to harsh environments such as in fibre composite formation because the entire fluid path is sealed. Therefore damaging fibres cannot enter the system.

Variations fall within the scope of the present invention.

The second layer of the system may simply be open to ambient air, as long as it is isolated from the other layers, and in particular the heating air (which in this instance would need to be removed by a conduit).

The above technology is equally applicable to selective cooling as well as heating and it cooling and heating may be used in the same tool.

The invention claimed is:

1. A mould tool configured to form a workpiece, the mould tool comprising:
a first layer defining a first fluid chamber, an exterior tool face configured to define a mould shape for forming a workpiece and a temperature control surface opposite the tool face,
a second layer defining a second fluid chamber,
a separate exhaust layer that is disposed between the first and second layers and that defines an exhaust fluid chamber in fluid communication with the first fluid chamber, and
a heater assembly comprising a heater inlet, a heater outlet and a fluid heater disposed therebetween,
wherein the heater inlet is positioned within the second fluid chamber and the heater outlet is positioned within the first fluid chamber,
wherein the first and second layers are configured such that flow of fluid from the first fluid chamber into the second fluid chamber is prohibited, and
wherein the second and exhaust layers are configured such that flow of fluid from the exhaust fluid chamber into the second fluid chamber is prohibited.

2. A mould tool according to claim 1, wherein the exhaust layer defines an exhaust port in fluid communication with the exhaust fluid chamber.

3. A mould tool according to claim 2, wherein the exhaust port is nearer to the first layer than the second layer.

4. A mould tool according to claim 1, wherein the heater outlet is directed towards the temperature control surface.

5. A mould tool according to claim 1, further comprising a first insulating layer position between the first layer and the exhaust layer, the first insulating layer being constructed from material with a lower thermal conductivity than the first layer.

6. A mould tool according to claim 5, further comprising a second insulating layer position between the exhaust layer and the second layer, the second insulating layer being constructed from material with a lower thermal conductivity than the exhaust layer.

7. A mould tool according to claim 1, further comprising a thermal transducer configured to detect a temperature of the temperature control surface.

8. A mould tool according to claim 7, wherein the thermal transducer is in contact with the temperature control surface.

9. A mould tool according to claim 8, wherein the thermal transducer is resiliently biased towards the temperature control surface.

10. A mould tool according to claim 1, wherein the second layer comprises a combined fluid supply and electrical wire inlet.

11. A mould tool according to claim 1, wherein the second layer has a supply inlet, which supply fluid inlet is split into a heater flow into the heater inlet and a control flow bypassing the heater inlet arranged to flow directly into the first fluid chamber.

12. A mould tool according to claim 1, further comprising:
a base portion
movably attached to the mould tool and resiliently biased towards the temperature control surface,
such that the heater assembly self-aligns to the first layer.

13. A mould tool according to claim 12, wherein the fluid heater is an inline fluid heater having an outlet that is oriented, in use, towards the mould tool.

14. A mould tool according to claim 12, wherein the heater assembly further comprises an abutment member mounted for movement with the heater assembly, the abutment member being configured to project to a position further from the base than the heater outlet to contact the mould tool and thereby position the heater outlet in a predetermined position that is, in use, spaced away from the temperature control surface.

15. A mould tool according to claim 12, wherein the heater assembly further comprises a transducer that is movably attached to the base portion and resiliently biased such that the transducer aligns upon assembly to the first layer.

16. A mould tool according to claim 15, wherein the heater assembly and transducer are mounted by respective resilient elements, such that a resilient element mounting the transducer is less stiff than the resilient element mounting the heater assembly.

17. A mould tool according to claim 1, wherein the heater assembly further comprises an elongate tube section defining the heater inlet and the heater outlet, the elongate tube section extending from the second layer into the first layer.

18. A mould tool according to claim 17, further comprising a gasket adjacent the second layer, the gasket defining an orifice that is configured to form a fluid seal around the elongate tube section.

* * * * *